United States Patent [19]

Plaiss

[11] 4,232,537
[45] Nov. 11, 1980

[54] WHEELED VEHICLE LOCK

[76] Inventor: Charles E. Plaiss, 7058 North Olcott Ave., Chicago, Ill. 60631

[21] Appl. No.: 930,719

[22] Filed: Aug. 3, 1978

[51] Int. Cl.³ .......................... B62H 5/00; E05B 71/00
[52] U.S. Cl. ............................................ 70/233; 70/49; 70/185; 70/234; 70/238; 280/289 L
[58] Field of Search .................. 70/233, 234, 238, 53, 70/58, 33, 49, 184, 185, 186, 235, 236, 227, 252, 210; 280/289 L; 292/156, 157, 158, 139

[56] References Cited

U.S. PATENT DOCUMENTS

| 582,690 | 5/1897 | Roberts | 70/210 |
|---|---|---|---|
| 915,416 | 3/1909 | Creamer | 70/185 |
| 1,262,656 | 4/1918 | Fisher | 70/236 X |
| 1,469,401 | 10/1923 | Willett | 70/185 |
| 1,523,174 | 1/1925 | Comeau | 70/185 X |
| 1,895,594 | 1/1933 | Strandt | 70/210 X |
| 2,118,126 | 5/1938 | Wise | 70/185 X |
| 2,140,489 | 12/1938 | Wise | 70/234 X |
| 3,774,421 | 11/1973 | Stephans, Jr. | 70/234 |
| 4,055,060 | 10/1977 | Bellino | 70/234 |

FOREIGN PATENT DOCUMENTS

| 663202 | 3/1929 | France | 70/186 |
|---|---|---|---|
| 20159 | of 1898 | United Kingdom | 70/185 |

*Primary Examiner*—Roy D. Frazier
*Assistant Examiner*—Carl F. Pietruszka
*Attorney, Agent, or Firm*—Rummler and Snow

[57] ABSTRACT

A permanently attached lock for wheeled vehicles, such as bicycles or the like, wherein the bolt of the lock extends interiorally of the tubular head and fork stem and is locked therein to prevent rotation of said fork stem. Means are provided for anchoring a wire rope or restraint on said housing to effectively prevent theft of the vehicle when the rope is wound around a metal post or rack.

2 Claims, 8 Drawing Figures

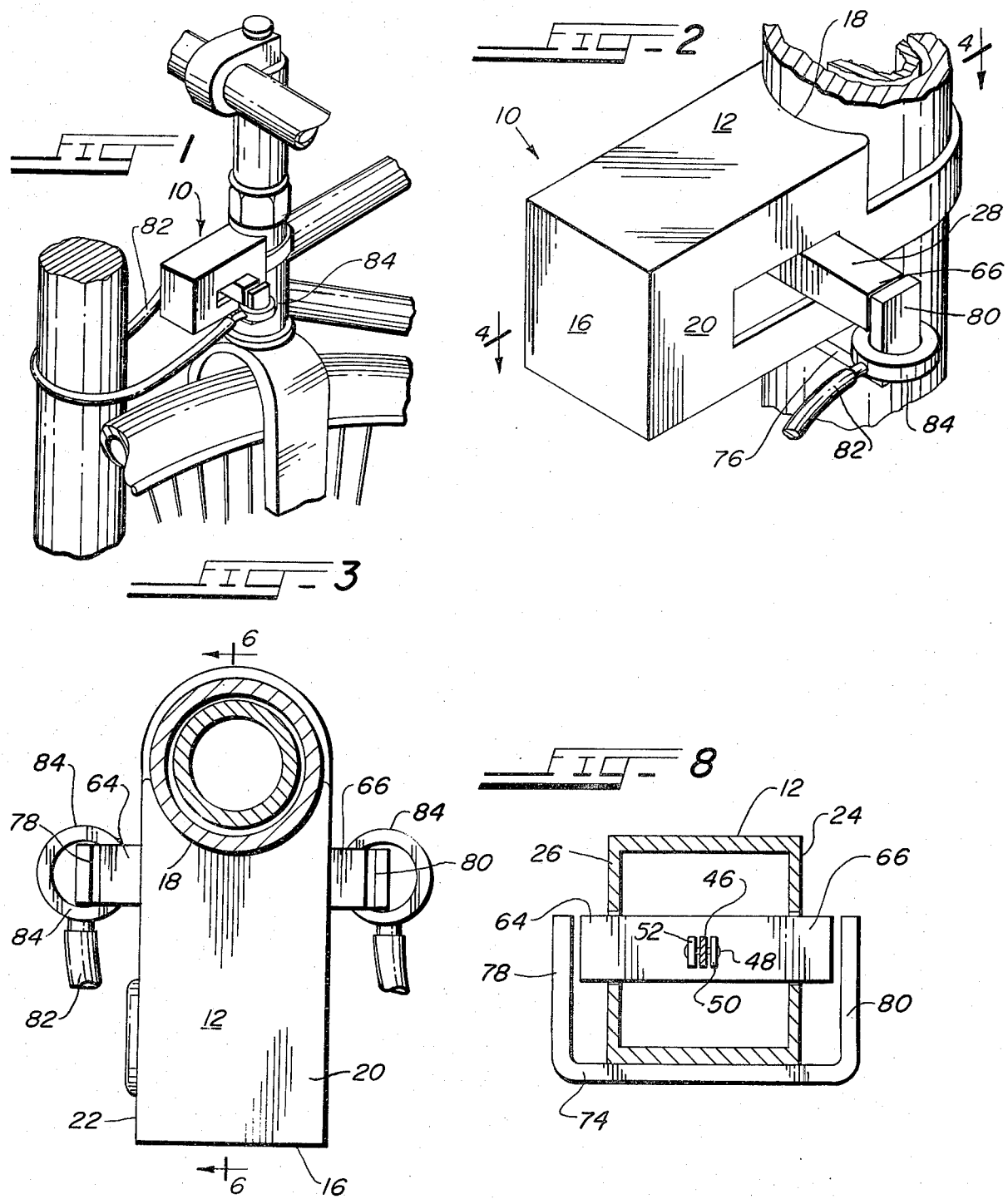

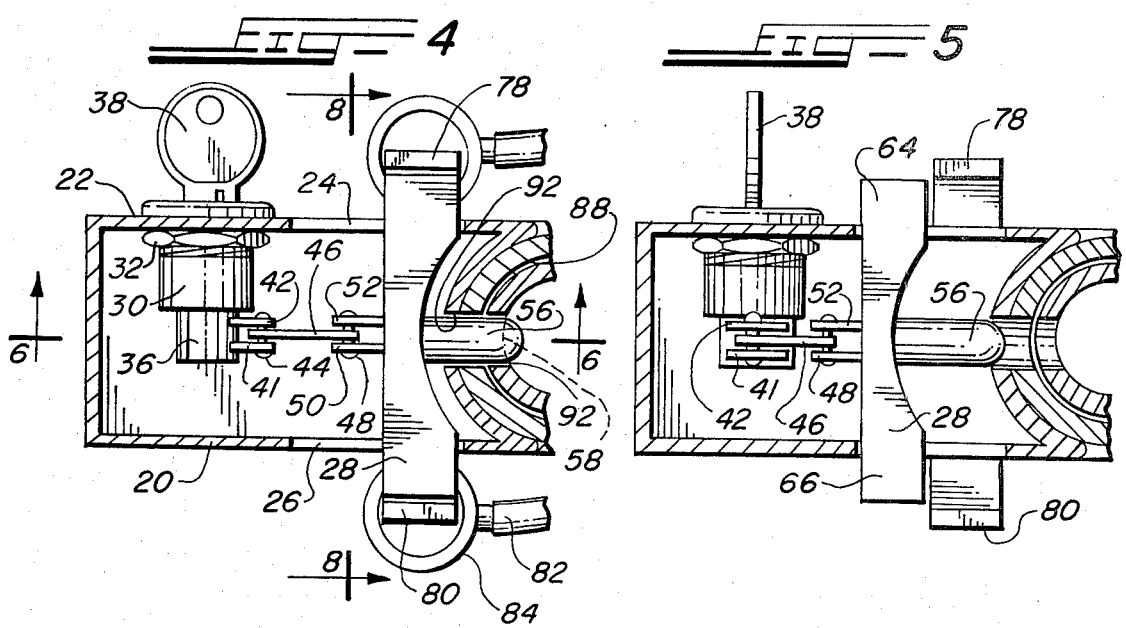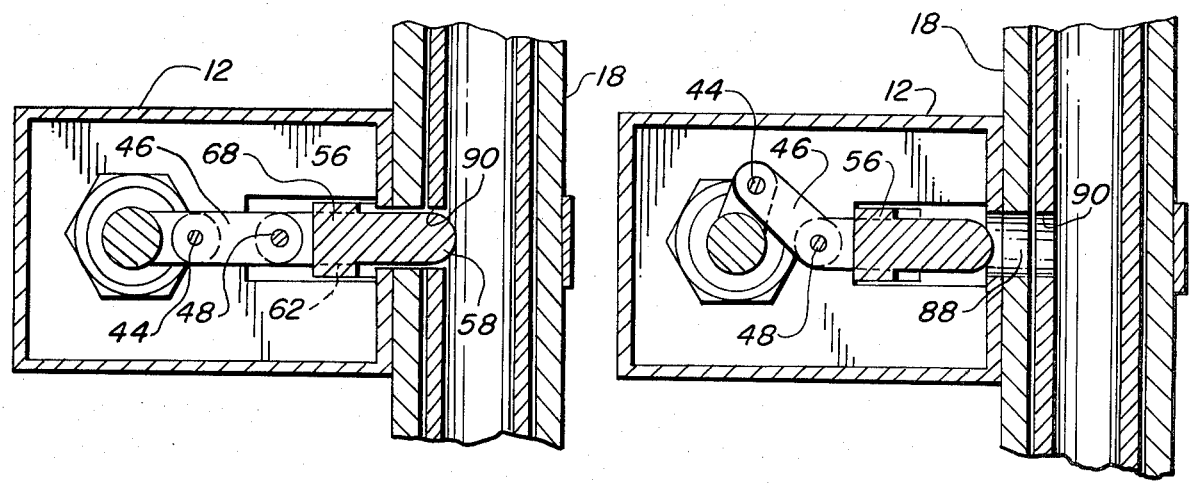

WHEELED VEHICLE LOCK

SUMMARY OF THE INVENTION

A wheeled vehicle lock permanently attached to the exterior of the head or sleeve of a wheeled vehicle, such as a bicycle, moped or the like, having an elongated, completely enclosed, hollow housing which has slotted openings in the side walls to receive a bar which extends outwardly of the side walls of the housing, bolt means on said bar medially of its end positioned in the housing and capable of being shifted outwardly of one end of the housing by a link arm and the plug of a tumbler cylinder lock and extending into aligned perforation in the stem and tubular head or sleeve of a vehicle. A pair of opposed arms extend outwardly from the bottom of the housing and a portion of each arm extending at right angles for supporting the rings on the ends of a wire rope and held therein when the bar is shifted toward the head of a wheeled vehicle to shift the bars over the area between the right angled portion of the arms and the side walls of the housing.

BRIEF DESCRIPTION OF THE DRAWINGS

FIG. 1 is a perspective view of my new lock applied to the head of a vehicle and shown attached to a pole;

FIG. 2 is a perspective view of an enlarged scale of the lock housing secured to the head of a vehicle;

FIG. 3 is a top elevational view of the device of FIG. 2;

FIG. 4 is a cross-sectional view taken on the line 4—4 of FIG. 2 with parts broken away showing the bolt in latched position;

FIG. 5 is a cross-sectional view similar to FIG. 4 but showing the bolt in unlatched position;

FIG. 6 is a cross-sectional view taken on the line 6—6 of FIG. 4;

FIG. 7 is a cross-sectional view similar to FIG. 6 but showing the bolt in unlatched position; and FIG. 8 is a cross-sectional view taken on the line 8—8 of FIG. 4.

DETAILED DESCRIPTION OF THE DRAWINGS

The lock of the present invention comprises a hollow housing 10 having a top wall 12, a bottom wall 14, an end wall 16, an arcuate end wall 18 and side walls 20, 22. Each side wall 20, 22 is provided with an elongated slot 24, 26 positioned medially between the top and bottom walls 12, 14 adjacent the curved end wall to receive a bar 28 which extends between the side walls 20, 22 and outwardly thereof.

The side wall 22 is provided with a cylinder tumbler lock indicated by the numeral 30 which is secured thereto by locknut 32 to anchor it on said side wall. The cylinder 34 extends interiorally of the housing, as shown in FIGS. 4, 5 and 6. It will be understood that the cylinder 34 carries the usual tumblers and plug 36 operable with key 38 which is rotated by the rotation of the key 38.

The plug 36 is provided with a yoke having a pair of spaced arms 40, 42 each having aligned perforations to receive a pivot rod 44 headed on both ends to prevent removal. A link arm 46 has a perforation in each end, the left hand end, as shown in the drawings, being pivotally secured to the rod 44 between the yoke while the other end is pivotally secured to pivot rod 48 positioned between a yoke having two horizontally extending arms 50, 52 in the same manner as the opposed end of link arm 46.

The arms 50, 52 are secured to the end 54 of the cylindrical latching bolt 56 and extend to the left, as shown in the drawings. The opposite end 58 of the bolt 56 is snub nosed.

The transverse bar 28 is provided with a perforation 62 medially of its ends 64, 66 and press fitted or otherwise secured to the bolt 56 adjacent the end 54 whereby upon rotation of the plug 36 by key 38 from the unlatched position shown in FIGS. 5 and 7 to that of the latched position shown in FIGS. 4 and 6, the link arm 46 will shift from its angular position (see FIG. 7) about pivot rods 44, 48 to a substantially horizontal position shifting the bolt out of the housing horizontally (see FIG. 6).

The end wall 18 is designed to abut against the head of a wheeled vehicle, such as a bicycle, moped, and the like. The device is permanently attached to the head by any suitable means such as by strap 86 emanating from the forward edge of the side walls 20, 22 and bonded to the head by a mastic or by screws or the like.

To be operative, the head 70 and stem 72 of the fork are drilled to a size slightly larger than the diameter of the bolt 56. The perforations 88, 90 in the head and stem, respectively, are aligned to seat the forward end of the bolt 56.

Laterally extending arms 74, 76 each extend outwardly from the bottom wall 14 of the housing and terminate in an upward right angled bend, 78, 80, to form vertically extending legs. When the bar 28 is in its porward position (see FIGS. 2, 3, 4 and 6), the ends 66, 68 will close the opening between the right angled members 78, 80, as seen in FIG. 4.

A wire rope 82 is provided with steel rings 84 on its ends, which rings are placed on the arms 74, 76, respectively, when the lock is inoperative. Upon forward shifting of the bolt 56, the rings are locked by the arms as seen in FIGS. 1, 2, 3 and 4.

Although the operation should be obvious from the above description, the housing 10 is permanently secured to the head after the aligned apertures are drilled in the head 70, 72, respectively, and the aperture 92 in the end wall 18 is aligned with the perforations 88, 90. When the key 38 is inserted in the lock and rotated approximately 90°, this will cause the lever arm 46 to shift from its angular position shown in FIG. 7 to the substantially horizontal position shown in FIG. 6 thus shifting the bolt 56 outwardly through the aperture 92 and into the perforations 88, 90. Before the bolt is shifted, however, the rings 84 must be placed on the arms 74, 76, respectively, so that when the bolt 56 is shifted forwardly, the ends of the bar 28 will close the area between the side walls 20, 22 and the vertical legs 78, 80, thus latching the rings therein. The key 38 is then removed.

The wire rope 82 which is appended to the rings 84 is placed around a light pole or vehicle rack before the rings are placed on the arms 74, 76.

Even though the slots 24, 26 will have a small space open when the bar is in operative position, the lever 46 cannot be moved in any direction by one attempting to steal the vehicle because the cylinder will not rotate without a key operating on the tumblers in the cylinder.

Although but one specific embodiment of this invention is herein shown and described, it will be understood that details of the construction shown may be altered or omitted without departing from the spirit of the invention as defined by the following claims.

I claim:

1. A wheel vehicle lock for permanent securement to the head of a wheeled vehicle having a fork stem seated therein and each having an aligned perforation, a closed hollow housing, having side, bottom and end walls, an aligned slot in each side wall, a perforation in one of said end walls, a keyed cylinder lock having a plug, said cylinder lock mounted on one of said side walls adjacent said slots, the cylinder and plug extending interiorally into said housing, a latch bolt, a transverse elongated bar anchored medially to said bolt positioned in and through said slots in said side walls and shiftable by said bolt, yokes on said plug and bolt extending towards each other, a link arm pivotally secured in and between said yokes whereby to shift said bolt horizontally into and out of said aligned perforations in said yoke and head by rotation of said cylinder lock.

2. The device according to claim 1 wherein a U-shaped bar having upwardly extending legs and a connecting leg, said connecting leg permanently secured medially to the bottom wall of said housing adjacent an end wall and extending outwardly of the side walls, said upwardly extending legs being wider than said bar, a wire rope having rings anchored to the ends of said rope adapted to seat on said connecting leg and be captured by said bar and upstanding legs when said bolt is position in the aligned perforations.

* * * * *